United States Patent [19]

Newman et al.

[11] Patent Number: 5,335,301

[45] Date of Patent: Aug. 2, 1994

[54] FIBER OPTIC CONNECTOR WITH SLIDING KEY

[75] Inventors: David L. Newman, Chicago; Leopold Kiernicki, Niles; Philip Schofield, Oak Park; James W. McGinley, Schaumburg, all of Ill.

[73] Assignee: Methode Electronics, Inc., Chicago, Ill.

[21] Appl. No.: 57,733

[22] Filed: May 5, 1993

[51] Int. Cl.⁵ .......................... G02B 6/38; G02B 6/26
[52] U.S. Cl. ...................................... 385/75; 385/139; 385/60; 385/53; 385/76
[58] Field of Search .................. 385/70, 72, 53, 73, 385/75, 76, 60, 78, 81, 83, 88, 89, 92, 139; 439/680, 681

[56] References Cited

U.S. PATENT DOCUMENTS

| | | | |
|---|---|---|---|
| 4,787,706 | 11/1988 | Cannon, Jr. et al. | 385/76 X |
| 4,986,769 | 1/1991 | Adams, III et al. | 439/681 |
| 5,016,968 | 5/1991 | Hammond et al. | 385/78 |
| 5,037,175 | 8/1991 | Weber | 385/76 |
| 5,041,025 | 8/1991 | Haitmanek | 439/681 |
| 5,166,995 | 11/1992 | Briggs et al. | 385/58 |
| 5,167,542 | 12/1992 | Haitmanek | 439/681 |
| 5,265,181 | 11/1993 | Chang | 385/75 |

OTHER PUBLICATIONS

American National Standard Institute, FDDI Physical Layer Medium Dependent (PMD), X3T9.5/84-48., Jan. 1987.

*Primary Examiner*—Brian Healy
*Attorney, Agent, or Firm*—David L. Newman

[57] ABSTRACT

A duplex optical fiber connector terminates two single or multi-mode optical fibers of a cable and is adapted to be joined to a receptacle being polarized correspondingly to a keying element of the connector. The keying element is slidable into multiple positions so that a recess in the keying element mates with a correspondingly positioned rib of a receptacle. The recess of the keying element is positioned within a channel axially extending on the connector exterior body.

20 Claims, 2 Drawing Sheets

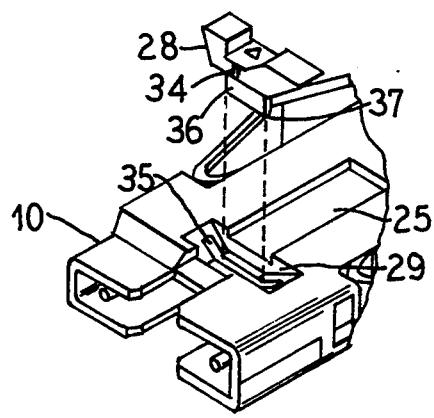
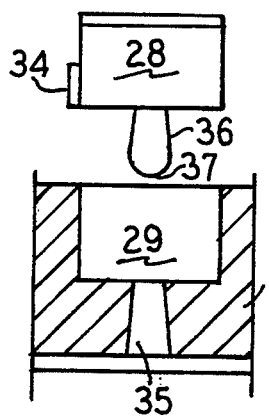
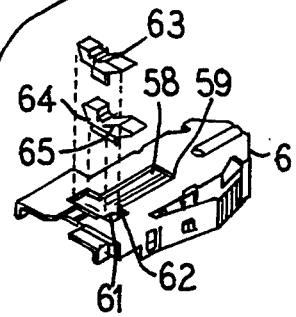
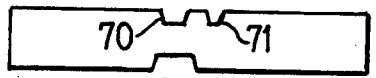
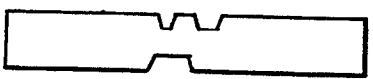
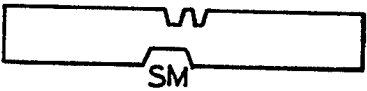
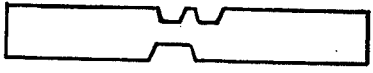
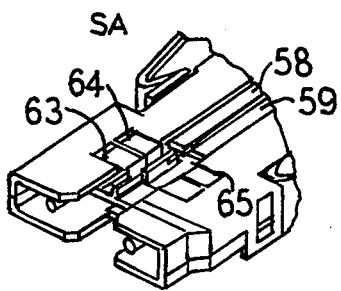
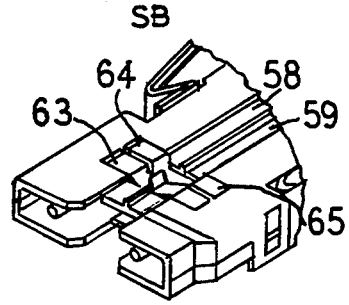
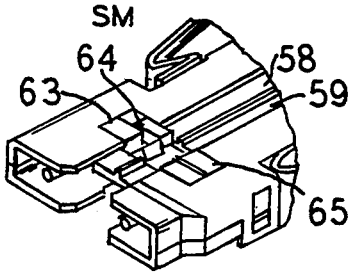
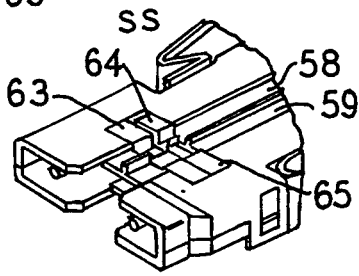

FIBER OPTIC CONNECTOR WITH SLIDING KEY

BACKGROUND OF THE INVENTION

This invention pertains to an improved fiber optic connector with a keying element. Keying systems are known in the connector art to enable particular connectors to be intermateable with only particular receptacles. Such polarization ensures that a connector having a specific key may only be connected to a receptacle having a complementary keying configuration. In the fiber optics area, the conducting of signals for equipment, such as local area networks (LAN), require polarization of the connected fibers connecting the components. Because each connection includes an input path and an output path, and the output of one station must be correctly connected to the input of another station, it is absolutely necessary that correct polarization of all physical connections be maintained at all times. Also, it is necessary that stations be connected in proper sequence. Thus, a keying system having four keying combinations may be established for multi-mode connectors, for example, the American National Standards Institute (ANSI) has proposed under Standard X3.166-1989 a media interface connector having A, B, and (S) slave configurations wherein the slave position configuration may mate to a receptacle having any of the various keying configurations. Four different keying configurations also denote single-mode connectors: SA, SB, SM and SS. Single-mode denotes connectors which have one single optical mode or propagation state of the communication signal which results in an optical fiber core significantly smaller than for multi-mode. Multi-mode denotes connectors which have multiple optical modes in which the communication signal is propagated.

U.S. Pat. No. 5,166,995 discloses a connector assembly suitable for connecting duplex fiber optic fiber cables to each other having removable keying elements. The patent discloses three removable keying elements, each having a recess located in a different position at the top of the key. Each keying element has a post which is inserted into an aperture of the plug body. Upon insertion of the keying element into the plug body, proper polarization of the connector is obtained.

However, the aforesaid U.S. patent only discloses a connector assembly including removable keys. Such a keying element which is removable is disadvantageous because the loose keys may be misplaced and under certain circumstances may be difficult to insert in the connector. In addition, three separate keying elements require increased production and molding costs for the manufacture of the connector assembly. Therefore, an improved connector assembly that does not require loose, removable keys is needed.

SUMMARY OF THE INVENTION

A principle object of this invention is to provide a fiber optic connector which provides polarization of the connector wherein a sliding key is incorporated into the connector assembly.

It is another object of this invention to provide a connector which provides for a means for polarization which is easily converted to multiple configurations and is easily manufactured.

This invention relates generally to a duplex fiber optic connector for terminating two optical fibers of a cable and being adapted to be joined to a receptacle. The present invention may apply to single or multi-mode applications. The duplex connector comprises an exterior shape corresponding to the shape of the opening of a receptacle. The connector is axially insertable into the opening of the receptacle. The connector includes an axially extending channel which has a width corresponding to a receptacle mating configuration. The duplex connector further comprises a keying element in the channel, blocking the width of the channel. The keying element has a recess, and the keying element is moveable so that the recess may be positioned toward one side of the channel for receiving a rib of a receptacle when the rib is positioned toward one side of the channel. The rib is then received in the recess upon the connector being axially inserted into the receptacle opening.

Further, this invention pertains to a duplex connector comprising a keying element which is slidably moveable to permit insertion of multiple configurations of a receptacle. The keying element includes a detent to frictionally engage a ridge of the connector body to hold the keying element stationary within the connector body and in a corresponding configuration to the rib of a receptacle. The keying element further includes an exterior surface which is substantially flush with the exterior surface of the connector. The exterior surface of the keying element includes multiple ridges whereby the keying element is easily gripped by a fingertip.

This invention also contemplates a means for identifying the position to which the keying element has been placed in correspondence with a corresponding receptacle configuration. In an alternative embodiment, the connector may have the letters A, M and B marked thereon for multi-mode applications. The connector assembly may also include a corresponding mark on the keying element whereby the movement of the keying element aligns the mark with the corresponding letter on the connector body signifying the mating configuration which will accept the corresponding receptacle.

In an alternative embodiment, a keying element is provided which includes a recess in a keying element which has a width equal to the width of the axially extending channel of the connector so that the S (slave) configuration of the receptacle is mateable with the connector of this invention.

In a further alternative embodiment, the connector comprises two keying elements acting in coordination to block the axially extending channel of the connector so that keying configurations SA, SB, SM and SS are attained and marked thereon for single-mode applications.

In another alternative embodiment, the connector comprises keying elements on both sides of the connector housing so that a single connector housing may accommodate either a single-mode or multi-mode application.

DESCRIPTION OF THE DRAWINGS

There is shown in the attached drawing a presently preferred embodiment of the present invention wherein like numerals in the various figures pertain to like elements, and wherein:

FIG. 4 is an enlarged view of the connector having the keying element of the present invention removed;

FIG. 5 is a cross-sectional side view of the keying element and a cavity and groove of the shell of the connector of the present invention;

FIG. 6 is a perspective view of a connector housing top having a single-mode keying element of the present invention;

FIGS. 7A-D are cross-sectional views of a receptacle showing the four single-mode mating configurations of the present invention; and FIGS. 8A-D are perspective views of a connector housing showing the keying element configurations of the present invention as it pertains to the receptacle cross-section of FIG. 7.

DETAILED DESCRIPTION OF THE PRESENTLY PREFERRED EMBODIMENTS

The present invention relates to an improved fiber optic connector. The fiber optic connector assembly is better understood by reference to FIGS. 1-7 which show various aspects of a preferred fiber optic connector with sliding key of the present invention.

Figure 1:
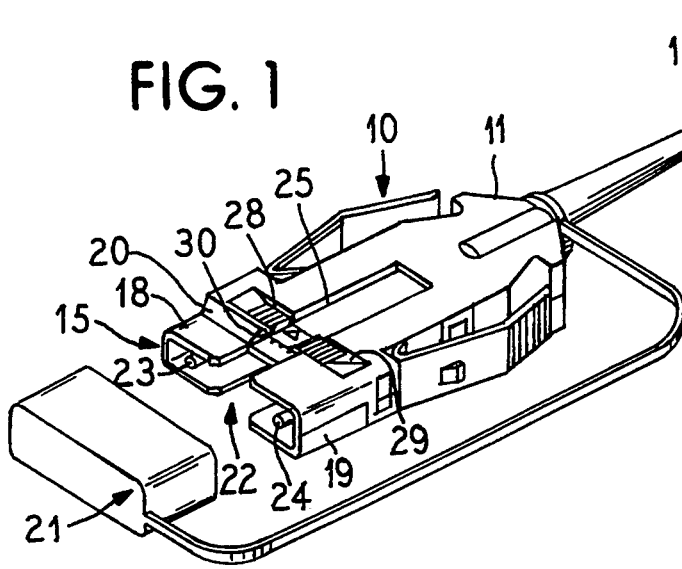
FIG. 1 is a perspective view of a connector having a multi-mode keying element of the present invention.
Figure 3A:
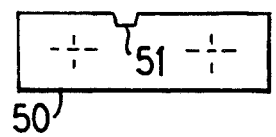
FIGS. 3 A-D are cross-sectional front views of a receptacle showing the four multi-mode mating configurations of the present invention.
Figure 3B:
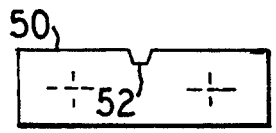
Figure 3C:
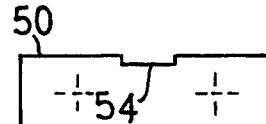
Figure 3D:
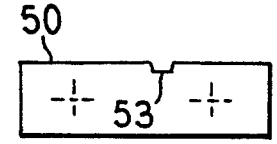
Figure 2:
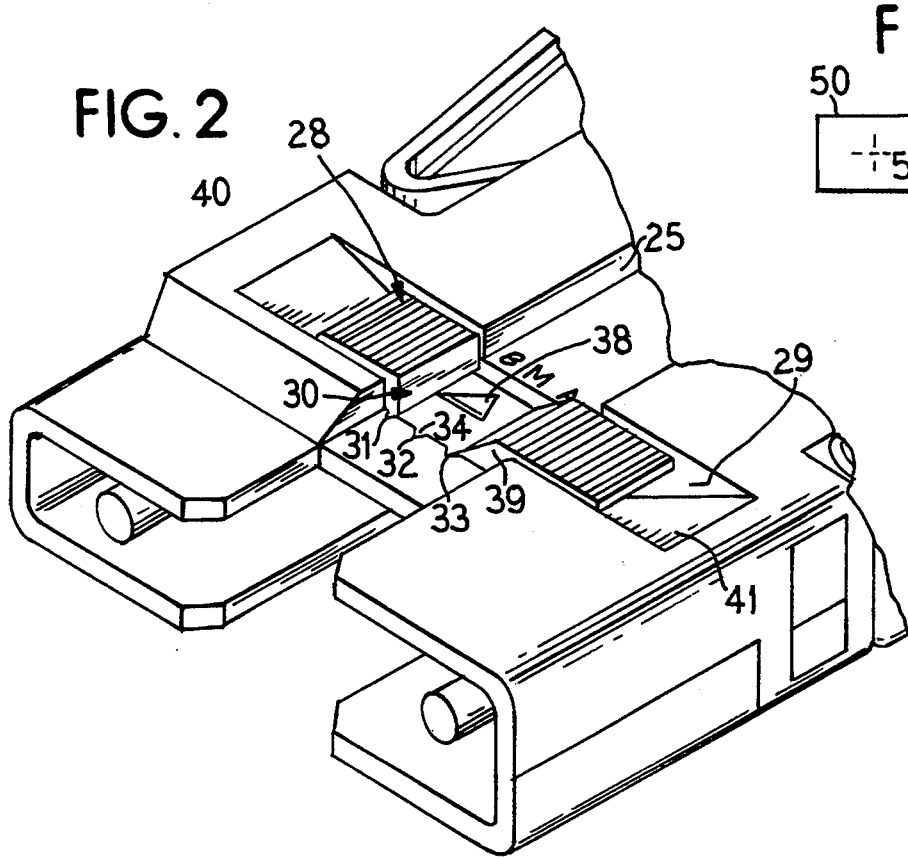
FIG. 2 is an enlarged view of the front of the connector of the present invention as illustrated in FIG. 1.

FIGS. 1-4 relate to multi-mode duplex fiber optic connectors, and FIGS. 6-8 relate to single-mode duplex fiber optic connectors. Turning first to multi-mode connectors, FIG. 1 shows a connector 10 having an outer shell 11. The connector 10 is attached to a cable 13 which at its entry into the rear of the connector 10 is surrounded by a strain relief boot 14. At a front end 15 of the connector 10, there is one-half of a male shroud element 18. At the opposite side of the front end 15 is one-half of a female shroud element 19 formed offset to the male shroud element 18. The smaller height of the male shroud element 18 is evident by the appearance of a beveled portion 20 which tapers inwardly of the connector shell 11 and from which the male shroud element 18 extends. The male and female shroud elements 18 and 19 are reversed on the single-mode connector to provide polarization (FIGS. 8A-D). Such a configuration provides for an alternative embodiment of the present invention in which a single connector may include a multi-mode keying element configuration on the bottom housing and a single-mode keying element configuration on the top housing 60 (FIGS. 8A-D). Such a dual purpose connector would reduce manufacturing costs so that both multi-mode and single-mode applications could be accommodated by a single connector. A gap 22 is formed between the shroud elements 18, 19 at the front end 15 of the connector 10. The shroud elements 18, 19 cover ferrules 23, 24. The ferrules 23, 24 are protected by a dust cover 21 which frictionally engages the shroud elements 18, 19.

Extending rearwardly from a gap 22 at the top surface of the connector shell 11 is channel 25. The depth of a channel 25 corresponds with the height of a rib 51, 52, 53, 54 of a receptacle 50 (FIGS. 3A-D) into which the connector 10 will be inserted. The rib 51, 52, 53, 54 of the receptacle 50 may be located in three different lateral positions, all of which can be accommodated by the width of the channel 25. Placed transversely across the channel 25 near the front 15 of the connector 10 is a key 28. The key 28 is positioned within a cavity 29 which extends across the width of the connector 10. The base of the cavity 29 includes a groove 35 (FIG. 4) which extends transversely to the channel 25 into which a projection 36 of the key 28 is inserted. The projection 36 extends transversely from the body of the key 28, and extends the length of the key 28. The projection 36 tapers so that the tip 37 of the projection 36 must be snap-fit into the groove 35 and is securely held in the groove 35 by the broad tip 37 of the projection 36 which is force-fit into the groove 35 (FIG. 5). Groove 35 is also tapered forming a narrow top opening and a broad bottom portion so that the tip 37 of the projection 36 upon insertion may slide freely within the groove 35. Following insertion of the projection 36 into the groove 35, the tip 37 expands to restrict vertical movement and removal of the key 28 from the groove 35. However, the key 28 is moveable in a horizontal direction within the groove 35 allowing the key 28 to slide laterally across the channel 25 of the connector 10. The key 28 of the preferred embodiment includes a recess 30 (FIG. 2) which has a width which corresponds to the width of the rib 51, 52, 53 of the receptacle 50. Alternate embodiments of the keying element of the present invention may also include a recess which has a width which corresponds to the width of the rib 54. The depth of the recess 30 corresponds with the depth of the channel 25 so that the base of the recess is flush with the base of the channel 25.

Turning to FIGS. 2 and 3A-D, a preferred embodiment is shown wherein the cavity 29 has at its front edge within the channel 25 three notches, 31, 32, 33 which engage a detent 34 of the key 28. The three notches 31, 32, 33 correspond with the three configurations, B, M, A of the receptacle rib, respectively. The notch 31 corresponds with letter configuration B; the notch 32 corresponds with configuration M; and the notch 33 corresponds with configuration A. So, for example, when the key 28 is slid so that the detent 34 engages the notch 31, the recess 30 accepts the receptacle 50 having the rib 53 in configuration B. Upon insertion of the connector 10 into the receptacle 50, the rib 53 will slidingly engage the channel 25 and the recess 30 of the key 28, whereby the connector 10 may be inserted fully into the receptacle 50 so that a positive connection is made between the ferrules 23, 24.

Should connection with a receptacle having a different configuration be attempted, the rib 51, 52 or 54 of the receptacle 50 will contact the front of the channel 25 and be prohibited from further movement through the channel 25 by the position of the key 28 in an alternative configuration. For example, the receptacle 50 having the rib 52 in configuration M having been attempted to be mated with the connector 10 in which the sliding key 28 is in position A, e.g., when the detent 34 is engaged in the notch 33, the non-corresponding rib 52 of the receptacle 50 will abut a surface 39 of the key 28 prohibiting further movement of the rib 52 the through channel 25. When the key 28 is slid from position A toward the center of the channel 25 so that the detent 34 engages the notch 32, the key 28 will be in the M configuration which will then allow it to accept the receptacle 50 having the rib 52 in the corresponding M configuration. The key 28 may then be slid to its last position A so that the detent 34 of the key 28 is engaged within the notch 33 so that the recess 30 is aligned to receive the receptacle 50 having a rib 51 in corresponding configuration A. In the preferred embodiment, the key 28 may be embossed with an arrow 38 which indicates the configuration B, M or A of the key 28 in its selected position. In an alternative embodiment, the keying element of the present invention may also include the S configuration which may be similarly marked thereon.

The cavity 29 which holds the key 28 of the present invention in its preferred embodiment has sloping sides 40 and 41. The sloping sides 40 and 41 are designed to give the least interference within the interior of the connector 10 so that the ferrule assembly is given maximum clearance within the connector assembly. The placement of the cavity 29 and the key 28 at the front of the channel 25 and near the front 15 of the connector 10 allows for the immediate detection as to whether a positive connection is made when the connector 10 is inserted into the receptacle 50. As the key will either allow insertion of the rib 52 of the receptacle 50 through its recess 30 or block the insertion of the rib 52 through the channel 25 upon its insertion at the very beginning of the channel 25, an operator attempting to insert the connector 10 within the receptacle 50 will quickly find that such connection is successful or unsuccessful.

Turning to FIGS. 3A-D, the receptacle mating configurations are shown. These cross-sectional views of the receptacle 50 having the inwardly protruding rib 51, 52, 53, 54 correspond with the American National Standards Institute (ANSI) standard X3.166-1990 (page 19, FIG. 8). The four configurations are shown: A, B, M and S. As shown for "type S," the slave configuration has the rib 54 which has a width equal to the widths of the A, B and M rib widths combined. The height of the rib 52 corresponds to the depth of the channel 25 of the connector shell 11 and the recess 30 of the keying element 28.

Turning to a single-mode embodiment of the present invention and FIGS. 6-8; FIG. 6 shows a connector housing top 60 including two parallel channels 58, 59 extending axially on the connector housing top 60 having two transverse cavities 61, 62. The cavity 61 retains a first keying element 63. The cavity 62 retains second keying elements 64 and 65.

Turning to FIGS. 7 and 8(A-D), the connector is shown in FIGS. 8A-D across from the corresponding receptacle into which that keying configuration of the connector will be inserted. The top connector having the SA configuration is achieved by moving the first keying element 63 to the SA position and moving the second keying elements 64, 65 apart so that both second keying elements 64 and 65 are aligned with the SS position. Moving the first keying element 63 to the SA position causes the channel 59 to become narrower at the keying area to correspond to the narrow rib 71, while the channel 58 is unchanged in its width at the keying area corresponding to a broad rib 70. Such a configuration will allow the ribs 70 and 71 to slide along the channels 59, 58, respectively, of the connector. The SB configuration is achieved by sliding the first keying element 63 to the SB position narrowing the channel 58 at the keying area while retaining the second keying elements 64, 65 in the SS position. The SM configuration is achieved by sliding the first keying element 63 to the center position and moving the second keying elements 64, 65 together so that the keys are in abutting alignment, and the key 65 is aligned with the SM position narrowing the parallel channels 58, 59 at the keying area. The SS configuration is attained by sliding the first keying element 63 to the center position and moving the second keying elements 64, 65 apart so that both second keying elements 64, 65 are aligned with the SS positions so that the parallel channels 58, 59 are both broad at the keying area.

In an alternative embodiment, the connector as shown in FIGS. 8A-D may have a single-mode keying element on the top portion of the connector housing and a keying element for the multi-mode connector on the bottom housing so that the connector housing may be used for either a single-mode or a multi-mode application. The receptacle configurations as showing in FIGS. 7A-D show the multi-mode rib protruding from the bottom of the receptacle and the single-mode configuration achieved by the ribs 70, 71 from the top of the receptacle.

It should be understood that various changes and modifications of the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim:

1. A duplex optical fiber connector for terminating two optical fibers of a cable and being adapted to be joined to a polarized receptacle, said connector comprising:
   an exterior shape corresponding to the shape of an opening of the receptacle, said connector being insertable into said opening along an axis of said receptacle;
   an axially extending channel having a width corresponding to a receptacle mating configuration; and
   a keying element in said channel blocking said width of said channel, said keying element having a recess, said keying element being movable transverse to said axis so that said recess may be positioned toward one side of said channel for receiving a rib of said receptacle when said rib is positioned toward said one side of said channel to be received in said recess upon said connector being axially inserted in said receptacle opening.

2. The connector assembly of claim 1 wherein said keying element is fixedly attached to said connector.

3. The connector assembly of claim 1 wherein said keying element is slidably moveable permitting insertion of multiple configurations of said receptacle.

4. The connector assembly of claim 1 wherein said keying element includes a detent to frictionally engage a ridge of said connector body surface abutting said keying element, said detent holding said keying element stationary within said connector body, said keying element in a stationary configuration corresponding to said rib of said receptacle.

5. The connector assembly of claim 1 wherein said keying element includes an exterior surface which is substantially flush with the exterior surface of said connector.

6. The connector assembly of claim 5 wherein said exterior surface of said keying element having multiple ridges whereby the said keying element is easily gripped by a fingertip.

7. The connector assembly of claim 1 wherein said connector includes a means for identifying the position to which said keying element has been placed in correspondence with a corresponding receptacle configuration.

8. The connector assembly of claim 1 wherein said connector has at least the letters A, M and B marked thereon and a corresponding mark on said keying element whereby the movement of said keying element aligns said mark with the corresponding letter signifying the mating configuration which will accept said corresponding receptacle.

9. The connector assembly of claim 1 wherein said connector has at least the letters SA, SB and SM marked thereon and a corresponding mark on said keying element where the movement of said keying element aligns said mark with the corresponding letter signifying the mating configuration which will accept said corresponding receptacle.

10. The connector assembly of claim 1 wherein said width of said channel is greater than said rib width of said receptacle.

11. The connector assembly of claim 1 wherein said connector includes a groove within the exterior of said connector surface; and said keying element having a projection extending transversely from said keying element body, said projection being insertable into said groove.

12. The connector assembly of claim 11 wherein said projection slides in said groove laterally across said channel.

13. The connector assembly of claim 11 wherein said connector includes a cavity extending transversely to said channel, said cavity having said groove extending therethrough.

14. The connector assembly of claim 11 wherein said projection includes a head which restricts removal of said projection from said groove.

15. The connector assembly of claim 1 wherein said connector includes two parallel channels extending axially within the exterior of said connector surface; and said keying element providing intermateability with a single-mode receptacle.

16. The connector assembly of claim 1 wherein said connector includes: at least two keying elements being slidably configured in order to block at least two channels extending axially on the connector, said keying elements providing intermateability with a single-mode receptacle.

17. A duplex optical fiber connector for terminating two optical fibers of a cable and being adapted to be joined to a polarized receptacle, said duplex connector comprising:

an exterior shape corresponding to an opening of the receptacle for being insertable into said receptacle along an axis of said receptacle; and means for polarizing said connector whereby said connector is insertable only into correspondingly configured receptacles having an inwardly protruding rib which corresponds with a position of said means for polarizing, said means for polarizing being fixedly attached to said connector wherein said means for polarizing is transversely slidable to said axis.

18. The connector assembly of claim 17 wherein said means for polarizing includes a slidable keying element located transverse to an axially extending channel of said connector, said keying element having a recess for slidably engaging said rib of said receptacle when said recess is positioned to accept the correspondingly positioned rib of said receptacle.

19. The connector of claim 17 wherein said means for polarizing includes a first polarizing means on a first side of a housing of said connector for mating in single-mode applications and a second polarizing means on a second side of the housing of said connector for mating in multi-mode applications.

20. A duplex optical fiber connector for terminating two optical fibers of a cable and being adapted to be joined to a receptacle, said duplex connector comprising:

an exterior shape corresponding to the shape of an opening of the receptacle, said connector being insertable into said opening along an axis of the receptacle;

an axially extending channel having a width corresponding to a receptacle mating configuration, wherein said width of said channel is greater than the width of a rib of said receptacle;

a keying element in said channel blocking said width of said channel, said keying element having a recess, said keying element being slidably moveable transverse to said axis so that said recess may be positioned toward one side of said channel for receiving said rib of said receptacle when said rib is positioned toward said one side of said channel to be received in said recess upon said connector being axially inserted in said receptacle opening, whereby said connector permits insertion of multiple configurations of said receptacle, said keying element having an exterior surface which is substantially flush with the exterior surface of said connector and said exterior surface of said keying element having multiple ridges whereby said keying element is easily gripped by a fingertip, said keying element having a detent to frictionally engage a ridge of the connector body surface abutting said keying element, said detent holding said keying element stationary within said connector body, said keying element in a stationary configuration corresponding to said rib of said receptacle; and means for identifying the position to which said keying element has been placed in correspondence with a corresponding receptacle configuration wherein said connector has letters marked thereon and a corresponding mark on said keying element whereby the movement of said keying element aligns said mark with the corresponding letter signifying the mating configuration which will accept said corresponding receptacle.

* * * * *